United States Patent

[11] 3,617,560

| [72] | Inventors | Maurice Deul;<br>Edward A. Mihok, both of Pittsburgh, Pa. |
|---|---|---|
| [21] | Appl. No. | 9,249 |
| [22] | Filed | Sept. 17, 1969 |
| [45] | Patented | Nov. 2, 1971 |
| [73] | Assignee | The United States of America as represented by the Secretary of the Interior |

[54] LIMESTONE NEUTRALIZATION OF DILUTE ACID WASTE WATERS
7 Claims, 2 Drawing Figs.

| [52] | U.S. Cl. | 210/47, 23/61, 23/200, 210/48, 210/50 |
|---|---|---|
| [51] | Int. Cl. | C02c 5/04 |
| [50] | Field of Search | 210/50, 45, 46, 59, 60, 47, 48; 23/61, 200 |

[56] References Cited
UNITED STATES PATENTS

| 785,312 | 3/1905 | Langley | 210/50 |
|---|---|---|---|
| 1,254,009 | 1/1918 | Hughes et al. | 23/61 |
| 1,310,382 | 7/1919 | Auld et al. | 210/45 |
| 1,824,936 | 9/1931 | Travers | 210/50 X |
| 3,516,931 | 6/1970 | Birch | 210/46 |

*Primary Examiner*—Michael Rogers
*Attorneys*—Ernest S. Cohen and Roland H. Shubert

ABSTRACT: Dilute acid wastes, such as mine drainage waters, are neutralized by reaction with an extremely finely divided limestone slurry after which the neutralized effluent is aerated to strip carbon dioxide and oxidize ferrous iron. After clarification, the product stream is suitable for disposal in surface waters.

3,617,560

LIMESTONE NEUTRALIZATION OF DILUTE ACID WASTE WATERS

BACKGROUND OF THE INVENTION

Dilute acid waste water streams constitute a longstanding water pollution problem which continues to grow in magnitude. It has been estimated that as much as 3.5 million tons of acid is discharged into the streams of the United States annually resulting in major damages to more than 4,000 miles of streams. Chemical quality of water is degraded whenever acid wastes are discharged into streams in quantities sufficient to overcome the natural neutralizing capacity of the stream. Such acid-degraded water often kills fish and other organisms, damages recreational and esthetic values and requires expensive treatment before being used for industrial or domestic purposes.

Substantial quantities of acid waste streams are generated industrially. Typical acid waste waters include rinse waters from iron pickling and dilute acid wastes from a variety of chemical processes. Mining activity results in the formation of acid mine drainage waters due to the reaction of ground water with various sulfide minerals, especially pyrite, to produce sulfuric acid solutions containing dissolved iron.

Industrial acid wastes, especially relatively concentrated wastes, are conventionally neutralized with lime. Dilute acid wastes may also be neutralized in this manner, but there are two major disadvantages to such a procedure. First, lime represents a high-cost source of alkalinity, and secondly, lime-precipitated solids occupy relatively large volumes thus creating disposal problems.

In order to overcome these difficulties, it has been proposed and attempted in the past to substitute limestone for lime. Most of these attempts have met with only limited success at best because surface coatings of neutralization products formed on the limestone surfaces and hindered further reaction. In our previous work with limestone neutralization, published in the Bureau of Mines Report of Investigations 6987 (1967), we found that coarse limestone, maintained in a dynamic state with mine water and air will neutralize acid and remove iron. Vigorous cascading agitation of particulate limestone provided sufficient abrasion to eliminate coating of the limestone particles with precipitated solids, provided a large aeration surface for oxidation of ferrous iron and resulted in removal of carbon dioxide from the reacting solution This same general approach was taken by F. P. Calhoun whose was published as Treatment of Mine Drainage with Limestone; Proceedings, Second Symposium on Coal Mine Drainage Research, Mellon Institute, Pittsburgh Pa., May 1968, pages 386–391.

In our 1967 work, we found that acid neutralization proceeded relatively rapidly; often approaching completion in reaction times of one minute or less. However, removal of ferrous iron presented a much more difficult problem. Reaction times of 15 to 25 minutes or more were necessary to effect satisfactory iron removal in those waters having a high-ferrous content.

SUMMARY OF THE INVENTION

We have now found that the limitations inherent in previous processes for the limestone neutralization of acid waste waters may be overcome in a relatively simple manner. Instead of using a limestone abrasion or grinding means as a reactor through which the total of waste water flow is passed, we found that splitting the waste water flow and passing only a minor portion of that flow through the reactor results in significant process advantages. In short, we have found that this new process modification can increase the neutralization capacity of a plant by as much as 300 to 600 percent.

Our previous work had been based upon the premise that continuous agitation of limestone, such as in a tube mill, continually renewed active surfaces for reaction with the acid waste water. Subsequent laboratory work ascertained the fact that the bulk of neutralization capacity of the previous process depended upon the generation of extremely fine limestone particles on the order of 1 to 10 microns in size. Particles of this size are capable of extremely rapid and complete reaction with acid wastes.

As water flow through a grinding or agitation means increases however, the production of particles within this very small size range decreases drastically. This is thought to be the result of hydraulic factors in which medium sized particles are carried from the mill before they are completely comminuted. Thus, the previous process resulted in the anomaly that as total flow increased, neutralization capacity decreased.

In this invention, we no longer utilize the limestone agitation or grinding means as the primary neutralization reactor. Rather, we limit the flow of acid waste water through the grinding means to a low-level which maximizes the production of extremely fine limestone particles. The slurry of particles thus produced is then mixed and reacted with the major portion of the waste water stream. Extremely rapid (on the order of 5 seconds or less) reaction then occurs.

Previous processes also relied upon the reactor or grinding means to provide sufficient aeration and detention time to strip carbon dioxide from the waste water stream, thus rasing its pH, and to oxide any ferrous iron present to the ferric state. Capacity of the disclosed process is significantly increased, especially in those waste streams having a high-ferrous content, by performing the carbon dioxide stripping and ferrous oxidation as a subsequent and separate step.

Carbon dioxide resulting from the limestone neutralization limits attainable pH to a level of about 5 to 6. In order to raise the pH beyond this point, it is necessary to remove carbon dioxide from the solution. Agitation, such as that occurring in the previous limestone neutralization processes, has been found to be far less efficient for this purpose than is air sparging. Oxidation rate of ferrous to ferric iron is well known to be extremely sensitive to pH; the oxidation rate increasing rapidly as pH increases from about 5 to 7 or higher. Hence, by performing the carbon dioxide removal as a separate aeration step, oxidation of ferrous iron and its removal as a precipitate is greatly speeded. This additional benefit also increases the capacity of neutralization plant to produce a neutralized and stream-disposable effluent product.

Hence, it is an object of this invention to provide a process for the limestone neutralization of acid waste water streams.

It is another object of this invention to maximize the neutralization and iron-removing capabilities of limestone-acid-waste-treating processes.

A further object of this invention is to provide a process for the neutralization of acid mine drainage waters utilizing an autogenously milled limestone slurry.

DETAILED DESCRIPTION OF THE INVENTION

Figure 1:
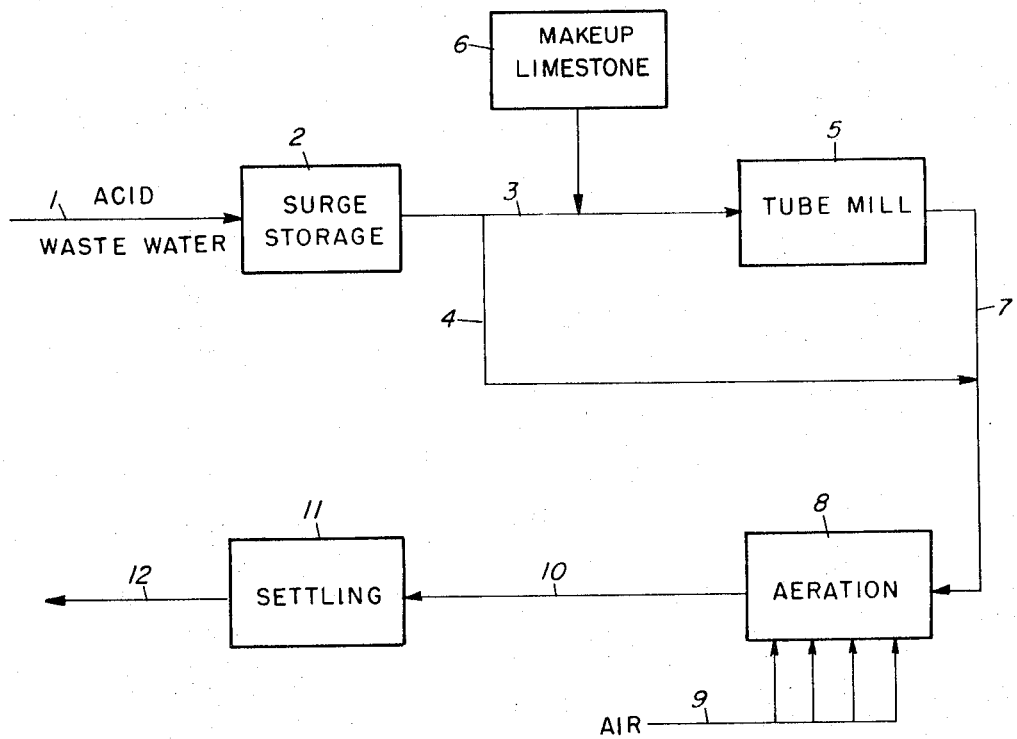

The invention will be more clearly understood by reference to the accompanying drawings in which:

FIG. 1 represents a schematic flow diagram of the disclosed process.

Figure 2:
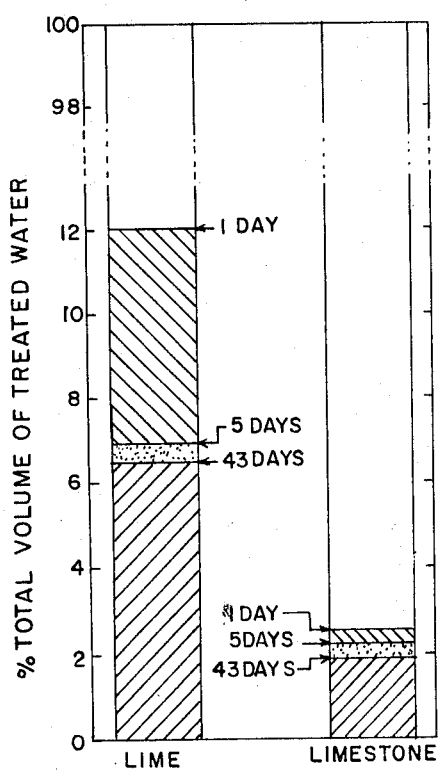

FIG. 2 illustrates the difference in precipitate or sludge the disclosed produced by limestone neutralization as compared to the conventional lime neutralization. Referring now to FIG. 1, a stream of acid water waste 1 flows into surge storage means 2. Provision of surge storage capacity, which is not always necessary, is highly desirable in those cases where the waste water flow rate is fluctuating or intermittent. In the case of acid mine waters containing ferrous iron some oxidation of ferrous to ferric iron will also occur during storage.

A controlled flow of waste water is drawn from storage means 2 and is split into two streams, 3 and 4. Stream 3, comprising only a small fraction of the total flow, is passed into limestone grinding means or mill 5. Mill 5 may comprise any conventional type of grinding mill provided that it is capable of producing a very finely divided product having a median particle size of less than about 10 microns. It is preferred that mill 5 comprise an autogenous-type tube mill. Make up limestone feed is added to the mill by means of hopper 6.

A particulate limestone slurry stream 7 is removed from the mill and is mixed with the major portion of the waste water stream bypassing the mill via conduit 4. It is preferred that mixing means such as riffles or baffles be provided in conduit 7 after its juncture with stream 4 so that the neutralizing limestone slurry is thoroughly mixed with the acid water waste stream. It has been found that a mixing time as short as 5 seconds is sufficient for substantially complete reaction to occur.

The combined limestone slurry and acid waste water streams are then passed to aeration means 8 having air supply means 9. Aeration means 8 may comprise any conventional devices capable of intimately contacting water with an oxygen-containing gas. A combination of surface aeration and air sparging was found to be adequate. The treated effluent stream entering aeration means 8 typically will have a pH in the range of 5 to 6. This low pH is due almost entirely to dissolved carbon dioxide. Sparging with as little as one-third cubic feet of air per gallon of effluent is sufficient to strip much of the dissolved carbon dioxide, thus raising the pH to the range of 6.5 to 7. Aeration also contributes to efficiency of iron removal in those waste water streams containing ferrous iron by oxidizing the iron from the ferrous to the ferric stage.

The aerated effluent stream is then passed via conduit means 10 to settling means 11. Means 11 may conveniently comprise a single lagoon or settling pond but may also comprise any other means conventionally used to separate particulate solids from water. A neutralized and clarified effluent is then discharged from the process by means of conduit 12.

The following examples are presented to illustrate and to more precisely define preferred embodiments of the invention

EXAMPLE 1

A pilot plant for carrying out the process depicted by FIG. 1 was constructed in order to evaluate the process with a natural acid mine water. An existing 3million gallon holding lagoon was used to level out the variable composition of water pumped from the mine and to obtain some reduction in ferrous iron by natural oxidation. This provided a mine water of fairly uniform composition for tests The grinding means consisted of a 3-foot diameter, 24-foot long tube mill operating in the autogenous mode and driven by a 15-horsepower variable-speed motor. Attached to the output end of the mill was a slurry discharge trough and sump connecting with a mine water feed and mixing trough. The mixing trough discharged into a 60,000-gallon aeration pond equipped with a surface aerator air-blower-sparging system. Effluent from the aeration step was passed into a 35,000 gallon sedimentation pond before being discharged from the process.

Previous laboratory experimentation had shown that extremely finely divided limestone would react rapidly and substantially completely upon agitation with acid mine water. The median particle size of limestone necessary to achieve such reaction was found to be on the order of 10 microns maximum.

A series of grinding tests using the previously described apparatus were commenced. At a tube mill speed of 25 r.p.m. a water flow through the mill of 60 g.p.m. and a mill loading of 7,000 pounds of ¼×3-inch limestone, only about 1.6 pound per minute of suitably fine limestone was produced. At the same conditions, but at a water flow of about 10 g.p.m., up to 6 pounds per minute of fine limestone was produced. In this latter test, 98.6 percent of the product passed through a 400-mesh screen and median particle size was about 8 microns with a high percentage of particles in the 1 to 5 micron range.

EXAMPLE 2

A 6-hour neutralization test of natural acid mine drainage water was made utilizing the pilot plant described in example 1. At the start of the test, the tube mill contained approximately 7,500 pounds of smoothly rounded limestone ranging in size from one-fourth to 3 inches. Limestone having a size range of 1 to 3 inches, assaying 72 percent $CaCO_3$ and 5.6 percent $MgCO_3$, was added continuously to the reactor at a rate approximating the consumption rate for the first 2 hours. Thereafter, limestone having a size range of 1½ inches by 0, assaying 82 percent $CaCO_3$ and 2.4% $MgCO_3$ was added at a higher feed rate. The mill contained approximately 9,000 pounds of limestone at the end of the test.

Process conditions were as outlined in the following table:

TABLE 1

| Mine water treated: | | |
|---|---|---|
| Flow rate | g.p.m. | 300–325 |
| Total volume | gal. | 120,000 |
| | | |
| Analyses, average: | | |
| pH | | 2.9 |
| Ferrous iron | p.p.m. | 36 |
| Total iron | p.p.m. | 360 |
| Total acidity | p.p.m. | 1,690 |
| Temperature | °C. | 18–19 |
| | | |
| Tube mill conditions: | | |
| Speed | r.p.m. | 25 |
| Limestone load, lb.: | | |
| Start of test | | 7,500 |
| End of test | | 9,000 |
| Limestone size | inch | 3 by 0 |
| Slurry flow rate | g.p.m. | 7.2 |

Amount of fine limestone produced at higher mill loadings near the end of the test was sufficient to treat a flow of approximately 480 g.p.m. Approximately 5 seconds mixing time was provided between the point at which limestone slurry mixed with the mine water and the time it discharged the aeration pond. the aeration pond Precipitates comprising gypsum crystals and iron oxide floc were already forming at the end of this brief interval. Results of the test are summarized in the following table:

TABLE 2

| | $CaCO_3$, pound per minute [1] | | | Treated effluent | | |
|---|---|---|---|---|---|---|
| | | | | Before aeration, | After aeration | |
| Elapsed time, hour | Required | Produced [1] | Excess | pH | pH | Fe, p.p.m. |
| 0.75 | 4.6 | 4.6 | 0.0 | 5.15 | 6.80 | |
| 1.75 | 4.6 | | | 5.00 | 6.65 | |
| 3.25 | 4.7 | 5.5 | .8 | 5.30 | 6.80 | |
| 4.25 | 4.7 | 6.1 | 1.4 | 5.70 | 6.75 | 3 |
| 5.75 | 4.7 | 6.7 | 2.0 | 5.70 | 6.75 | |
| 6.25 | 4.7 | 6.9 | 2.2 | 5.90 | 6.80 | 3 |

[1] Represents about 80 percent of total solids produced; the other 20 percent is inert material.

EXAMPLE 3

Another test was run using the same apparatus and the same acid waste water as in example 2. In this test however, all water treated was passed through the tube mill as has been conventional in the prior art. It was found that maximum capacity of the pilot plant operating in this mode was about 100 g.p.m. Effectively then, operation of the pilot plant in the manner of example 2 increased the treating capacity of the plant by a factor of about three to five times. Even higher capacity could be achieved by using a more pure limestone.

EXAMPLE 4

Settling tests were made on lime and limestone neutralized acid mine drainage waters. In each case, the water was treated to the same end conditions; to a pH of 6.9 with no detectable iron remaining in solution. Glass cylinders 48-inch high with a capacity of 4.9 liters were used in the test. Samples of lime and limestone neutralized waters were put in separate cylinders and allowed to settle. After 1 day, the volume of sludge from limestone neutralization was less than one-fourth the volume of sludge produced by lime neutralization. After 43 days, the sludge volume from the limestone process was less than one-third the volume of that from the lime process. These data are presented graphically as FIG. 2.

Precipitated material resulting from limestone neutralization of sulfuric acid waste water containing dissolved iron consists primarily of crystalline gypsum along with coprecipitated iron oxide. There is little or no tendency toward the formation of a flocculant, hydrous iron precipitate which is characteristic of similar streams neutralized with lime. Consequently, clarification and sludge disposal problems associated with lime neutralization are greatly alleviated.

These examples demonstrate the utility and advantages of the disclosed process as contrasted to conventional techniques. The examples presented all deal with the neutralization of acid mine drainage waters. However, this same technique will find application in the treatment of acid wastes, especially acid wastes containing dissolved metals, from a variety of other sources. For example this process may be used for the neutralization of pickle liquors and other more concentrated wastes if the wastes are diluted prior to treatment. Diluent may conveniently comprise clarified effluent from the process represented, for example, by conduit 12 of FIG. 1. The process may also be used in the treatment of other organic and inorganic acid wastes such as tannery and paper mill acid waste waters. It will be evident that other minor modifications or changes may be made in the disclosed process without departing from its spirit or scope.

What is claimed is:

1. A process for treating a relatively dilute waste acid stream which consists essentially of:
   a. grinding limestone with water in a rotating mill and limiting flow of water through the mill to generate a slurry of particulate limestone having a median particle size of less than about 10 microns;
   b. mixing at least about a stoichiometric amount of the particulate limestone slurry with the waste acid stream to produce an effluent stream containing dissolved carbon dioxide and having a pH in the range of 5 and 6 and
   c. aerating the effluent stream to strip dissolved carbon dioxide and produce a product stream having a pH above about 6.5.

2. The process of claim 1 wherein the waste acid stream comprises a mineral acid and also contains dissolved metals.

3. The process of claim 2 wherein the mineral acid is sulfuric acid, wherein the dissolved metal comprises iron, and wherein at least part of said iron is in the ferrous state.

4. The process of claim 3 wherein the aeration is continued for a sufficient time to substantially completely oxidize the ferrous iron to the ferric state.

5. The process of claim 3 wherein the particulate limestone slurry is produced by autogenous grinding.

6. The process of claim 5 wherein the waste acid stream is divided into a major portion and a minor portion; the minor portion being passed through the rotating mill at a rate which maximizes the production of extremely fine limestone particles.

7. The process of claim 6 which precipitated gypsum and iron oxide is removed form the aeration product stream by settling.

* * * * *